United States Patent [19]

Blodgett et al.

[11] Patent Number: 4,846,482
[45] Date of Patent: Jul. 11, 1989

[54] HIGH COMPLIANCE SEAL AND ENGINE COMBINATION

[75] Inventors: Mark S. Blodgett, Sterling Heights; Robert C. Ross, Detroit; Allen W. Cline, Milford, all of Mich.

[73] Assignee: General Motors Corporation, Detroit, Mich.

[21] Appl. No.: 234,718

[22] Filed: Aug. 19, 1988

[51] Int. Cl.$^4$ .............................................. F16J 15/06
[52] U.S. Cl. .................. 277/235 B; 277/211; 277/213; 277/215; 123/198 E
[58] Field of Search ............ 277/207 R, 208, 209, 277/210, 211, 213, 215, 235 B; 123/198 E

[56] References Cited

U.S. PATENT DOCUMENTS

| | | | |
|---|---|---|---|
| 2,616,736 | 11/1952 | Smith | 277/208 |
| 3,032,062 | 5/1962 | Blahnik | 277/211 X |
| 3,871,034 | 3/1975 | Weigel | 277/207 R X |
| 3,936,059 | 2/1976 | Gordon | 277/207 R |
| 4,293,138 | 10/1981 | Swantee | 277/207 A |
| 4,423,707 | 1/1984 | Sihon et al. | 123/198 E X |
| 4,457,522 | 7/1984 | Trieste et al. | 277/205 |
| 4,501,432 | 2/1985 | Kuniyoshi et al. | 277/235 B X |
| 4,616,460 | 10/1986 | Nicholas | 277/205 |
| 4,664,421 | 5/1987 | Jones | 277/207 A |

Primary Examiner—Robert S. Ward
Attorney, Agent, or Firm—Robert J. Outland

[57] ABSTRACT

A high compliance seal is applied between each cylinder block end wall and an intake manifold which acts as a cover for the lubricant containing space between the banks of a V-type engine. The seal is formed of a rubber-like resilient material with rows of small waffle-like recesses formed on each of the sealing sides between intersecting spaced longitudinal and lateral ribs. The longitudinal ribs on the upper side are laterally staggered with respect to those on the lower side to form, as viewed in transverse cross-section, a sinuous body configuration that straightens out and flattens so as to combine with deformation of the resilient material into the recesses to provide a high degree of resilient compliance without overstressing of the resilient material.

12 Claims, 2 Drawing Sheets

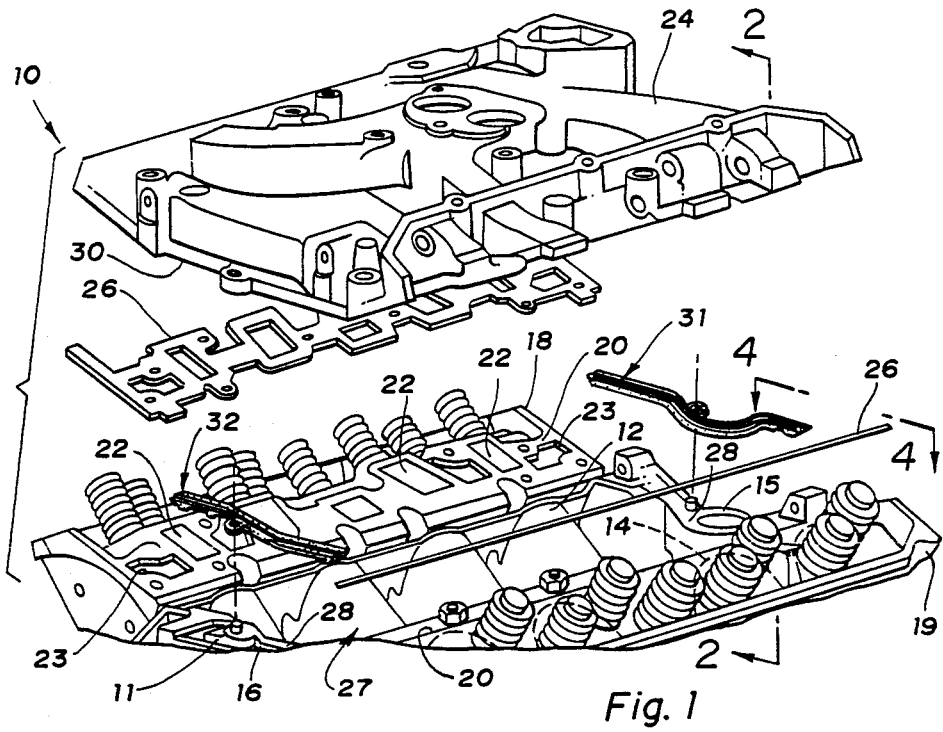
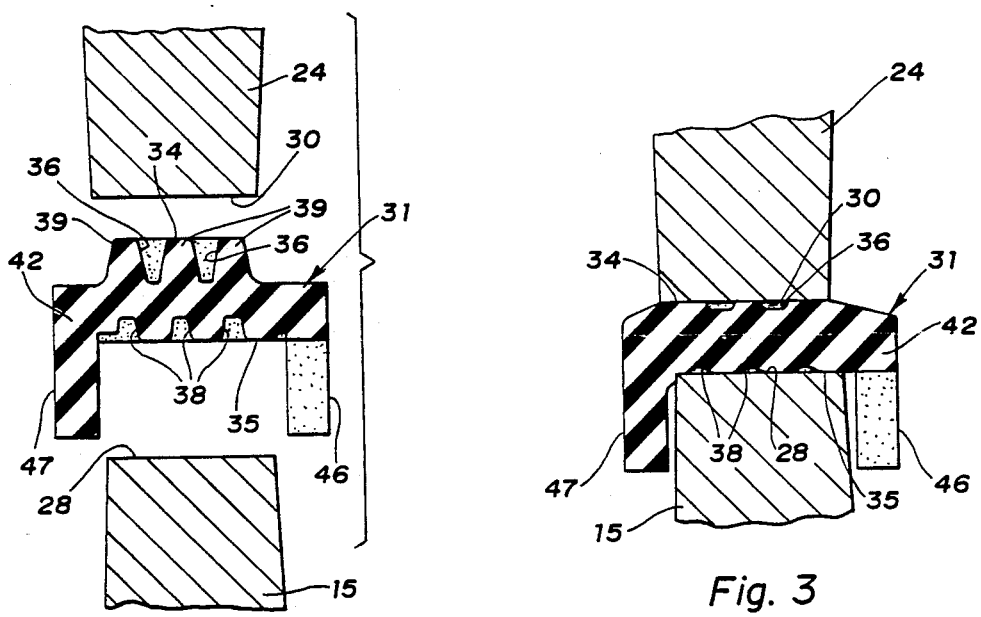
Fig. 1
Fig. 2
Fig. 3

HIGH COMPLIANCE SEAL AND ENGINE COMBINATION

TECHNICAL FIELD

This invention relates to resilient seals such as may be used between a fluid container and its cover and, particularly, to such seals for use in and in combination with a V-type engine having an oil mist containing cavity between cylinder banks of the engine block, the cavity being closed by a cover integral with an intake manifold made of diverse material.

BACKGROUND

It is known in the art relating to internal combustion engines to provide an intake manifold formed integral with a cover for closing the open top of the V-cavity between the banks of a V-type engine. In one such arrangement wherein an aluminum cylinder block is provided with an aluminum manifold and integral cover, the cover seats upon gaskets provided on the walls of cast iron cylinder heads mounted on the opposite cylinder banks and also sealingly engages front and rear end walls of the cylinder block that extend laterally between the cylinder banks. Resilient seals are provided between the tops of the block end walls and the bottom surface of the integral cover-manifold to seal the joints against the escape of oil and oil mist from the interior of the V-cavity.

Because of varying clearances between the cover-manifold and the block end walls of similar engines due to manufacturing tolerances and the relative motions which occur between the cover-manifold and the associated engine block end walls due to temperature changes during and between operating periods of the engine, the seal application may impose conditions of excessive compression on the seals. As a result, seal life may be adversely affected.

SUMMARY OF THE INVENTION

The present invention provides an improved high compliance seal for use in combination with the engine cylinder block and cover-manifold application as well as for other applications. The seal is formed of a rubber-like resilient material and has a length significantly greater than its width and height, to define a body having upper and lower sealing sides.

Among the improved features of the seal are rows of small waffle-like recesses formed on each of the sealing sides between intersecting spaced longitudinal and lateral ribs. Preferably, the waffle-like recesses are of substantially greater length than width and so provide greater open space for longitudinal flattening of the lateral ribs than for lateral flattening of the longitudinal ribs.

The longitudinal ribs on the upper side are laterally staggered with respect to those on the lower side to form, as viewed in transverse cross-section, a sinuous body configuration. Upon compression, the sinuous body configuration partially straightens out and flattens so as to combine with deformation of the resilient material into the recesses to provide a high degree of resilient compliance without overstressing of the resilient material.

The lateral ribs, in a preferred embodiment, are aligned on the upper and lower sides to provide a desired degree of resistance to compression. Optionally, however, the lateral ribs on the upper side may be longitudinally staggered with respect to those on the lower side to form a sinuous body as viewed in longitudinal cross-section so as to further increase the degree of resilient compliance of the seal.

Preferably, the ribs on the upper side of the seal which engage the cover-manifold are of substantially greater height than those on the lower side so as to provide for greater lateral compliance of the upper portion of the seal. This allows positive retention of the seal lower portion to the associated cylinder block wall while providing for relative motion of the cover and walls, due to temperature related differential expansion of the components longitudinally of the engine, to be primarily taken up in resilient lateral motion of the seal upper portion. In a preferred embodiment, the height of the upper ribs is approximately twice that of the lower ribs and the height of the lower ribs is about equal to the lateral width of the adjacent recesses.

Preferably the seal includes flange portions depending from the lateral edges to maintain the seal in position on the cylinder block wall prior to installation of the cover-manifold.

These and other features and advantages of the invention will be more fully understood from the following description of certain specific embodiments of the invention taken together with the accompanying drawings.

BRIEF DRAWING DESCRIPTION

In the drawings:

FIG. 1 is an exploded pictorial view of a portion of a partially disassembled V-type internal combustion engine showing the relative positions of the cylinder block, cylinder heads, cover-manifold, gaskets and end seals formed according to the invention;

FIG. 2 is a cross-sectional view of disassembled seal, wall and cover elements from the plane indicated by the line 2—2 of FIG. 1;

FIG. 3 is a cross-sectional view similar to FIG. 2 showing the seal, wall and cover elements in an assembled condition;

DETAILED DESCRIPTION

Figure 4:
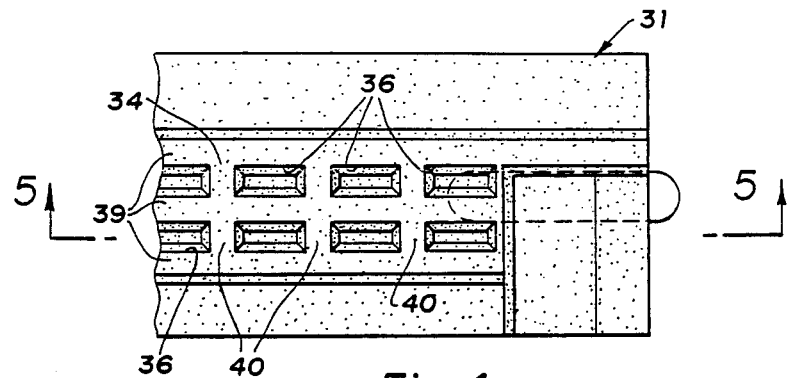
FIG. 4 is a top view of the rear end seal from the plane indicated by the line 4—4 of FIG. 1.

Referring now to the drawings in detail, numeral 10 generally indicates an internal combustion engine having a cylinder block 11 including right and left cylinder banks 12, 14, respectively, and rear and front end walls 15, 16 interconnecting the cylinder banks. Right and left cylinder heads 18, 19 are mounted on the respective cylinder banks.

The cylinder heads are each provided with manifold mounting surfaces 20 through which extend cylinder intake ports 22 and coolant passages 23 for connection with mating passages in an intake manifold 24. Manifold gaskets 26 are provided to seal the joints between the mounting surfaces 20 of the cylinder heads and mating surfaces of the intake manifold when the components are assembled.

Between the engine cylinder banks 12, 14 and the rear and front end walls 15, 16 in the "vee" of the engine, there is defined an open top chamber 27. This chamber may enclose a camshaft and associated valve gear, not shown, and normally communicates with the engine crankcase to allow the return of lubricating oil to the oil sump. Thus, chamber 27 contains, in operation, lubricating oil and oil mist mixed with crankcase oil and vapors and must, therefore, be closed by a suitable cover.

In the present instance, the manifold 24 also comprises a cover which extends into sealing relation, not only with the manifold gaskets 26 on the cylinder heads but also with upper surfaces 28 of the rear and front end walls 15, 16. Lower surfaces 30 at the rear and front ends of the cover 24 extend in opposition to the wall surfaces 28 to form joints which are sealed by the installation of high compliance resilient rear and front seals 31, 32, respectively, formed according to the invention.

As is best shown in FIGS. 2-6, each of the seals 31, 32 comprises an elongated body having a length dimension significantly greater than the corresponding width and height dimensions and shaped to follow the contours of its respective rear or front end wall 15 or 16. Each of the seal bodies 31, 32 includes an upper sealing side 34 and a lower sealing side 35. Each of the ealing sides is provided with two or more rows of small waffle-like recesses including upper recesses 36 and lower recesses 38.

The upper recesses 36 are formed between intersecting spaced longitudinal ribs 39 and lateral ribs 40. These ribs extend upwardly from a central main portion 42 of the body 31 or 32 to a height which is approximately twice the dimension of the lateral width of the recesses 36 formed between the longitudinal ribs.

The recesses 38 in the lower sealing surfaces are similarly formed by longitudinal ribs 43 and lateral ribs 44 extending along the lower side 35 of their respective seals 31, 32. The lower ribs 43, 44 extend downwardly from the main portion 42 of the seal to a height or distance approximately equal to the lateral width of the recesses 38 formed therebetween to form a sealing lower portion of the seal.

The illustrated seals have two rows of longitudinally elongated upper recesses defined between the ribs and three rows of lower recesses. However, it should be understood that additional rows of recesses could be provided if desired and the available space in the sealing application permits. It should also be noted that the illustrations of FIGS. 2-7 are enlarged several times greater than the size of the actual seals pictured, in which the recesses are relatively small indentations in the resilient seal body. In the seals illustrated, the recesses are, for example, about 1 mm wide and 3 mm long.

As is best seen in FIG. 2, the longitudinal ribs 39 on the upper side of the seal are laterally staggered with respect to the logitudinal ribs 43 on the lower side of the seal so that, in lateral cross-section through the recesses, the seal forms a sinuous body configuration.

Upon compression of the seal to its installed height, as is fancifully illustrated in FIG. 3, the seal is believed to be partly flattened by straightening out the sinuous body configuration so as to cause an extension of the body's lateral dimension while, at the same time, allowing deformation, or flattening, of the resilient material of the ribs into the recesses. In this way a high degree of compression of the seal is obtained through resilient compliance without overstressing of the resilient material of the seal. Thereafter, the waffle-like recesses are substantially reduced in volume and act as miniature suction cups to help retain the seal in place on the end wall and manifold while allowing relative lateral movement between the upper and lower sealing surfaces.

The sinuous configuration of portions of the body with generally equal sizing of the ribs and recesses allows the ribs to collapse into the opposite recesses upon compression (with the presumed straightening effect described above). In the illustrated embodiment of FIGS. 1-6, the seal was calculated to permit vertical compression of 60 percent without overstress while a previous seal designed without the pattern of ribs and opposing recesses reached its maximum stress at about 25-30 percent compression.

Figure 7:
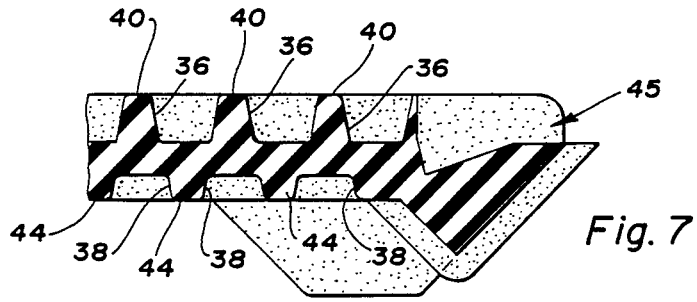
FIG. 7 is a cross-sectional view similar to FIG. 5 but showing an alternative embodiment of the seal configuration.

In the alternative embodiment of FIG. 7, the seal 45 has lateral upper ribs 40 which are also staggered with respect to the lateral lower ribs 44. These form, in longitudinal cross section, a sinuous body configuration that upon installation allows relatively free longitudinal extension of the seal together with the lateral extension obtained by flattening of the sinuous configurations. In this manner, an additional degree of resilient compliance may be provided if required in a particular application.

To further the degree of compliance, if desired, the recesses in the alternative embodiment of FIG. 7 may be made square so that the upper recesses are of essentially similar cross-section with the lower rib posts and vice versa. In this way, the posts can collapse into the opposite recesses and a maximum degree of compliant resilience may be obtained.

Figure 5:
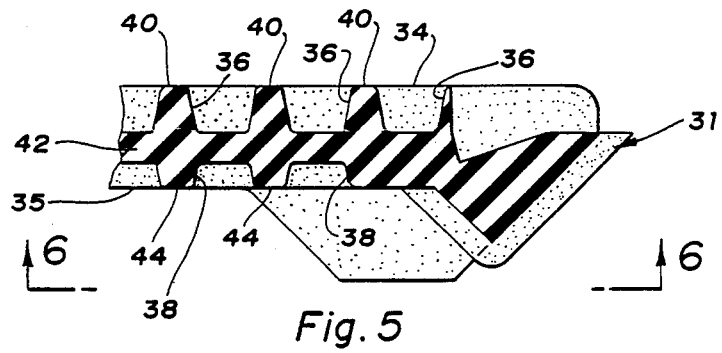
FIG. 5 is a longitudinal cross-sectional view through a portion of the seal from the plane indicated by the line 5—5 of FIG. 4.
Figure 6:
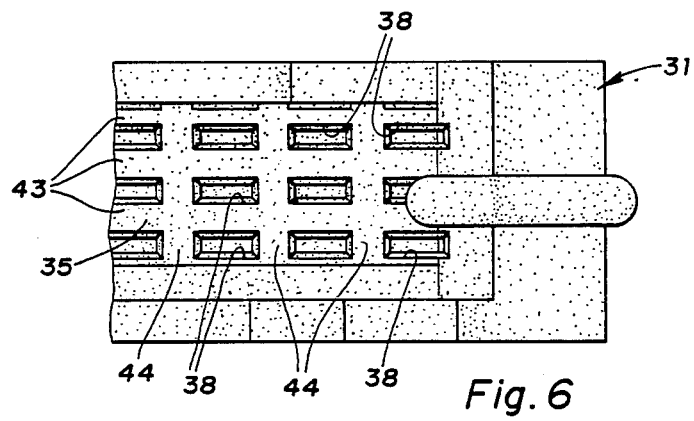
FIG. 6 is a bottom view of the seal from the plane indicated by the line 6—6 of FIG. 5

Referring particularly to FIGS. 2, 5 and 7, it is noted that the height of the ribs and the depth of the recesses in the upper portion of the seal is approximately twice that of those in the lower portion. This difference gives the lower portion greater lateral stiffness than the upper portion and allows the lower portion to seat solidly upon its respective end wall upper surface 28 and to remain fixed thereon. When compressed, the substantial suction provided by compression of the volume of the recesses makes them act as miniature suction cups which help retain the seal in place on the end wall.

The upper recesses 36 are similarly compressed and provide suction capability; however, the greater height of their associated ribs provides additional lateral resilience. This allows the upper seal portion to move with the lower surface 30 of the manifold 24 as it changes position relative to the associated end wall due to differences in their thermal expansion and contraction caused by temperature differences during operation or stopping of the engine. In this way, the upper portion of the seal maintains fixed sealing contact with the manifold wall while moving laterally with the wall movement, all without overstressing the resilient seal material.

In order to assist the installation of the seals 31, 32 in their respective positions, the seal bodies are provided with front and rear flange portions 46, 47 which depend from the front and rear edges of the seal bodies to hold the seals in position on their respective walls 15, 16 during the engine assembly operation. After installation of the manifold, the seal is retained in position by compression and the suction action of the reduced volume recesses 36, 38 so that the flanges 46, 47 no longer serve a substantial purpose.

By reason of the various features of the front and rear seals heretofore described, it is seen that the invention provides a resilient seal of high compliance for use in sealing engine block wall oil cavity covers, manifolds and the like and useful in addition for other applications.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. A resilient seal of high compliance for engine block wall oil cavity covers, manifolds and the like, said seal comprising:
   a body formed of a material of rubber-like resilience and having a length dimension significantly greater than corresponding width and height dimensions, said body having upper and lower sealing sides,
   said sealing sides each having rows of small waffle-like recesses formed between intersecting spaced longitudinal and lateral ribs extending along the sides, the longitudinal ribs on the upper side being laterally staggered with respect to those on the lower side to form, in transverse cross section through the recesses, a sinuous body configuration
   whereby, upon compression of the seal between opposing upper and lower members, the longitudinal ribs may be partly flattened by straightening of the sinuous body configuration and deformation of the resilient material into the recesses to provide a high degree of resilient compliance without overstressing of the resilient material.

2. A resilient seal as in claim 1 wherein the waffle-like recesses are of substantially greater length than width to provide greater open space for longitudinal compression of the lateral ribs than for lateral compression of the flattenable longitudinal ribs.

3. A resilient seal as in claim 1 wherein the lateral ribs on the upper side are longitudinally staggered with respect to those on the lower side to form, in longitudinal cross section through the recesses, a sinuous body configuration
   whereby, upon compression of the seal between opposing upper and lower members, the body may also allow deformation of the resilient material of the lateral ribs into the opposite recesses to provide an additional degree of resilient compliance without overstressing of the resilient material.

4. A resilient seal as in claim 1 wherein the ribs on the upper side are of substantially greater height than those on the lower side to provide in assembly greater lateral compliance in the upper portion of the seal and more positive retention of the seal lower portion to an associated lower member of such assembly.

5. A resilient seal as in claim 4 wherein the height of the upper ribs is on the order of twice that of the lower ribs and the height of the lower ribs is about equal to the lateral width of the adjacent recesses.

6. A resilient seal as in claim 1 and further comprising flange portions depending from lateral edges of the seal to maintain the seal in position on an associated member wall prior to assembly with another member.

7. A combination in an internal combustion engine of a cylinder block defining a fluid containing cavity open on one side with a wall of the block defining at least one edge of the cavity opening, a cover seatable on the wall and closing the open side of the cavity and an elongated seal between the wall and the cover for sealing the joint between them,
   said seal including a body formed of a material of rubber-like resilience and having a length dimension significantly greater than corresponding width and height dimensions, said body having upper and lower sealing sides, and the improvement wherein the resilient seal is of high compliance by reason of said sealing sides each having rows of small waffle-like recesses formed between intersecting spaced longitudinal and lateral ribs extending along the sides, the longitudinal ribs on the upper side being laterally staggered with respect to those on the lower side to form, in transverse cross section through the recesses, a sinuous body configuration whereby, upon compression of the seal between the wall and the cover member, the longitudinal ribs may be partly flattened by straightening of the sinuous body configuration and deformation of the resilient material into the recesses to provide a high degree of resilient compliance without overstressing of the resilient material.

8. A combination as in claim 7 wherein said cover is formed integral with an intake manifold and is made from a material diverse from that of the cylinder block and having a substantially different coefficient of expansion than the block whereby substantial relative motion of the wall and manifold occurs at the joint during various operating and nonoperating conditions experienced by the engine.

9. A combination as in claim 7 wherein the waffle-like recesses are of substantially greater length than width to provide greater open space for longitudinal compression of the lateral ribs than for lateral compression of the flattenable longitudinal ribs, and
   the ribs on the upper side are of substantially greater height than those on the lower side to provide in assembly greater lateral compliance in the upper portion of the seal and more positive retention of the seal lower portion to an associated lower member of such assembly.

10. A combination as in claim 9 wherein the height of the upper ribs is on the order of twice that of the lower ribs and the height of the lower ribs is about equal to the lateral width of the adjacent recesses
    and further comprising flange portions depending from lateral edges of the seal to maintain the seal in position on said block wall prior to assembly with said cover.

11. A combination as in claim 7 wherein the lateral ribs on the upper side are longitudinally staggered with respect to those on the lower side to form, in longitudinal cross section through the recesses, a sinuous body configuration whereby, upon compression of the seal between the wall and cover, the body may also allow deformation of the resilient material of the lateral ribs into the opposite recesses to provide an additional degree of resilient compliance without overstressing of the resilient material.

12. A resilient seal as in claim 1 wherein the waffle-like recesses are substantially reduced in volume upon compression to act as miniature suction cups which help retain the seal in place on the end wall while allowing relative lateral movement between upper and lower sealing surfaces, thus maintaining a upper and lower seal.

* * * * *